US008655258B2

(12) United States Patent
Fung

(10) Patent No.: US 8,655,258 B2
(45) Date of Patent: Feb. 18, 2014

(54) PC CONNECTABLE ELECTRONIC LEARNING AID DEVICE WITH REPLACEABLE ACTIVITY WORKSHEETS

(75) Inventor: Doric Fung, Tai Po (HK)

(73) Assignee: VTech Electronics Ltd., Hong Kong (HK)

( * ) Notice: Subject to any disclaimer, the term of this patent is extended or adjusted under 35 U.S.C. 154(b) by 1333 days.

(21) Appl. No.: 11/873,669

(22) Filed: Oct. 17, 2007

(65) Prior Publication Data

US 2008/0268414 A1    Oct. 30, 2008

Related U.S. Application Data

(60) Provisional application No. 60/852,234, filed on Oct. 17, 2006.

(51) Int. Cl.
*B09B 5/00* (2006.01)

(52) U.S. Cl.
USPC .......................... 434/308; 434/350; 434/322

(58) Field of Classification Search
USPC .......................... 434/350, 322, 323; 345/173
See application file for complete search history.

(56) References Cited

U.S. PATENT DOCUMENTS

| | | | | |
|---|---|---|---|---|
| 3,292,489 | A | * | 12/1966 | Johnson et al. ................. 353/25 |
| 4,425,099 | A | * | 1/1984 | Naden ............................ 434/335 |
| 4,464,118 | A | * | 8/1984 | Scott et al. ...................... 434/85 |
| 4,681,548 | A | * | 7/1987 | Lemelson ..................... 434/311 |
| 5,088,928 | A | * | 2/1992 | Chan ............................. 434/339 |
| 5,117,071 | A | * | 5/1992 | Greanias et al. .............. 345/178 |
| 5,485,176 | A | * | 1/1996 | Ohara et al. ................... 345/173 |
| 5,596,698 | A | * | 1/1997 | Morgan ......................... 715/863 |
| 5,670,992 | A | * | 9/1997 | Yasuhara et al. .............. 345/173 |
| 5,730,602 | A | * | 3/1998 | Gierhart et al. ............... 434/155 |
| 5,749,735 | A | * | 5/1998 | Redford et al. ........... 434/307 R |
| 5,895,906 | A | | 4/1999 | Danielson et al. |
| 5,991,594 | A | * | 11/1999 | Froeber et al. ................ 434/317 |
| 6,064,856 | A | * | 5/2000 | Lee et al. ....................... 434/350 |
| 6,178,308 | B1 | * | 1/2001 | Bobrow et al. ............... 434/350 |
| 6,201,947 | B1 | * | 3/2001 | Hur et al. ....................... 434/317 |
| 6,215,901 | B1 | * | 4/2001 | Schwartz ....................... 382/186 |
| 6,369,721 | B1 | * | 4/2002 | Yang et al. ...................... 341/21 |
| 6,416,326 | B1 | * | 7/2002 | Oh ................................. 434/178 |

(Continued)

FOREIGN PATENT DOCUMENTS

| | | |
|---|---|---|
| WO | WO 99/65007 | 12/1999 |
| WO | WO 0141101 A1 | 6/2001 |
| WO | WO 0141114 A1 | 6/2001 |

*Primary Examiner* — Robert J Utama
(74) *Attorney, Agent, or Firm* — McAndrews, Held & Malloy, Ltd.

(57) ABSTRACT

An embodiment includes an electronic learning aid apparatus including a base unit. The base unit includes a surface for accepting a printed activity worksheet, a sensor positioned beneath the worksheet surface, a microprocessor, a code-reading device, a memory for storing digital speech data and digital control data, a speech synthesizer and speaker, an input device, and a communication port capable of permitting the electronic learning aid apparatus to communicate with a personal computer. The apparatus further includes at least one printed activity worksheet having a code thereon that is readable by the code-reading device and serves to identify activity worksheets and associated digital speech data and digital control data. The digital speech data and digital control data serve to generate an output to the user in response to the user's manipulation of the input device as detected by the sensor when the child touches the stylus to the activity worksheet.

19 Claims, 12 Drawing Sheets

(56) References Cited

U.S. PATENT DOCUMENTS

| | | | |
|---|---|---|---|
| 6,427,063 B1 * | 7/2002 | Cook et al. | 434/350 |
| 6,463,257 B1 | 10/2002 | Wood | |
| 6,517,351 B2 * | 2/2003 | Spector | 434/169 |
| 6,535,204 B2 * | 3/2003 | Sun | 345/173 |
| 6,608,618 B2 * | 8/2003 | Wood et al. | 345/173 |
| 6,750,978 B1 * | 6/2004 | Marggraff et al. | 358/1.12 |
| 6,758,674 B2 * | 7/2004 | Lee | 434/155 |
| 6,801,751 B1 * | 10/2004 | Wood et al. | 434/362 |
| 6,816,703 B1 | 11/2004 | Wood et al. | |
| 6,882,824 B2 | 4/2005 | Wood | |
| 7,033,180 B2 * | 4/2006 | Fujita | 434/128 |
| 7,083,420 B2 * | 8/2006 | Wood et al. | 434/322 |
| 7,120,385 B2 * | 10/2006 | Marggraff | 434/317 |
| 7,238,024 B2 * | 7/2007 | Rehbein et al. | 434/157 |
| 7,299,971 B2 * | 11/2007 | Marggraff et al. | 235/375 |
| 7,803,049 B2 * | 9/2010 | Nakada et al. | 463/36 |
| 2002/0058240 A1 * | 5/2002 | Redford et al. | 434/307 R |
| 2002/0197588 A1 * | 12/2002 | Wood et al. | 434/185 |
| 2003/0027122 A1 * | 2/2003 | Stansvik | 434/323 |
| 2003/0059757 A1 | 3/2003 | Wood | |
| 2003/0129576 A1 | 7/2003 | Wood et al. | |
| 2005/0053907 A1 * | 3/2005 | Liao | 434/317 |
| 2005/0095568 A1 * | 5/2005 | Musolf et al. | 434/308 |
| 2005/0107031 A1 | 5/2005 | Wood et al. | |
| 2005/0186547 A1 * | 8/2005 | Yang et al. | 434/308 |
| 2005/0233287 A1 * | 10/2005 | Bulatov et al. | 434/114 |
| 2006/0188860 A1 * | 8/2006 | Morrison | 434/322 |
| 2006/0286893 A1 * | 12/2006 | Conaway | 446/227 |
| 2007/0026375 A1 * | 2/2007 | Dewey | 434/350 |
| 2007/0184427 A1 * | 8/2007 | Packard et al. | 434/350 |
| 2008/0268414 A1 * | 10/2008 | Fung | 434/308 |

* cited by examiner

Sam's Progress Report
Date:00/00/0000

Title: Language (Spelling)
Skill Areas
Strengths and Areas of Improvement    Score 70/100

Previous Reports

Record 1
Record 2
Record 3
Record 4
Record 4

1. Language – Area of Strength
      Level 1 – Exercise 1
      Level 2 – Exercise 2

2. Language – Needs extra practice
      Level 3 – Exercise 5

3. Follow Plan: You can aid your child's learning progress by explaining new concepts and reviewing his work

Fig. 8

PC CONNECTABLE ELECTRONIC LEARNING AID DEVICE WITH REPLACEABLE ACTIVITY WORKSHEETS

CLAIM OF PRIORITY UNDER 35 U.S.C. §119

The present application for patent claims priority to Provisional Application No. 60/852,234 entitled "PC Connectable Electronic Learning Aid Device With Replaceable Activity Worksheets" filed Oct. 17, 2006, and assigned to the assignee hereof and hereby expressly incorporated by reference herein.

BACKGROUND

1. Field

The present invention relates in general to microprocessor based educational devices and more particularly, to dual purpose electronic devices providing educational and entertainment activities to a child with the capability of being used both on a stand-alone basis as well as connected to a personal computer.

2. Background

Prior art electronic educational learning devices have historically taken the form of stand-alone specialized devices which commonly engage a child in educational activities directed to one or more specific educational subjects such as, for example, question and answer drills on spelling or math. A typical prior art electronic educational learning device incorporates an electronic voice synthesis module which converts digitally stored data into audible human speech towards prompting the child to take a specific action (such as identify a specific geometric shape) and/or respond to a specific question posed (spell a specified word). The child typically provides a response to the prompt via input mechanism (keyboard, buttons, etc.), which response is then compared to the correct answer or expected response stored in memory. An audible and/or visual indication is provided indicating whether the child's response to the command or question posed is correct or incorrect.

Early prior art electronic educational learning devices incorporated relatively small, often single line, LED or LCD displays which provided visual prompts and/or responses to the child. Prior art devices in some cases were used in connection with separate printed bound workbooks which provided visual support for one or more various educational activities executed by the device. More recent forms of prior art devices incorporate significantly more electronic memory and video capabilities such that more elaborate and more extensive interaction with the child is possible.

A typical prior art electronic educational device utilizes both internal memory and external memory cartridges or CD-ROMs which contain various educational activities, questions, answers and graphics and sound files which are presented to the child during operation of the device. Certain prior art devices further provided for the ability to obtain additional educational activities in the form of additional cartridges or CD-ROMs comprising additional questions and their respective answers relative to one or more educational subject matter areas and were thus not limited by the internally stored content. One such prior art device incorporated a removable memory cartridge which, when removed from the electronic learning aid apparatus, could be inserted into a separate physical docking station that was connected to a personal computer. Using the personal computer and its ability to connect via the internet to external servers and/or websites, a parent could download new content to the memory cartridge which could be then made available for use by the child when the memory cartridge was removed from the docking station and reinserted into the educational device.

While certain prior art educational devices have born a cosmetic appearance in the form of a clam shell design to mimic an adult laptop computer, a typical prior art electronic educational learning aid device functioned solely as a stand-alone device. Consequently, conventional electronic learning aids become "age obsolete," in that once a child has learned the device's programmed content, the device is of little use thereafter. Additionally, conventional electronic learning aids to not provide for robust tracking of a child's progress.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment includes an electronic learning aid apparatus including a base unit. The base unit includes a surface for accepting a printed activity worksheet, a sensor positioned beneath the worksheet surface, a microprocessor, a code-reading device, a memory for storing digital speech data and digital control data, a speech synthesizer and speaker, an input device, and a communication port capable of permitting the electronic learning aid apparatus to communicate with a personal computer. The apparatus further includes at least one printed activity worksheet having a code thereon that is readable by the code-reading device and serves to identify activity worksheets and associated digital speech data and digital control data. The digital speech data and digital control data serve to generate an output to the user in response to the user's manipulation of the input device as detected by the sensor when the child touches the stylus to the activity worksheet.

Thus, various embodiments provide a portable electronic educational learning aid device that may be used in a stand-alone mode and may also be connected to a personal computer and used in a PC mode. This permits the child to engage in the same education activities when the educational learning aid device is used in the PC mode as when used in a stand-alone mode. This further allows for the ability to utilize the video display monitor of the personal computer to function as a display screen for the electronic learning aid device and wherein the portable learning aid device may be used as an input device toward engaging in the educational activities running on the PC and specifically where the stylus and buttons located on the portable device may be used by the child to interact with the programming to, for example, navigate the learning activity and respond to questions posed thereby when the electronic education learning device is connected to the PC. The inter-operability between the device according to various embodiments and a PC assists the child in transitioning from an electronic educational learning aid device to a full fledged personal computer and encouraging the child to continue to use the electronic educational learning aid device given the enhanced ability to interact with the PC towards prolonging use of the product by a child without the need to learn the complexities of interacting with a typical personal computer.

Furthermore, various embodiments provide for monitoring the child's progress in a given subject matter by uploading to the PC the number of correct and incorrect responses provided by the child, by subject matter, and providing a progress report to a parent or teacher, toward permitting the parent or teacher to customize the curriculum and select additional activities to be downloaded from the Internet to the PC and device and made available to the child using the device in both PC and stand-alone modes. Accordingly, both parent/teacher and child may be provided with progress reports summarizing the child's performance and permitting the parent or teacher to configure new curriculum to alter the educational activities on the portable device to add new activities as the child progresses or repeat prior activities to reinforce subjects or address underperformance in particular subjects, including the ability to select and print new activity worksheets for use with the portable educational device.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 8 illustrates the video display comprising one embodiment of a user interface used to facilitate selection of additional activity worksheets for downloading to the electronic learning aid device.

DETAILED DESCRIPTION

Figure 1:
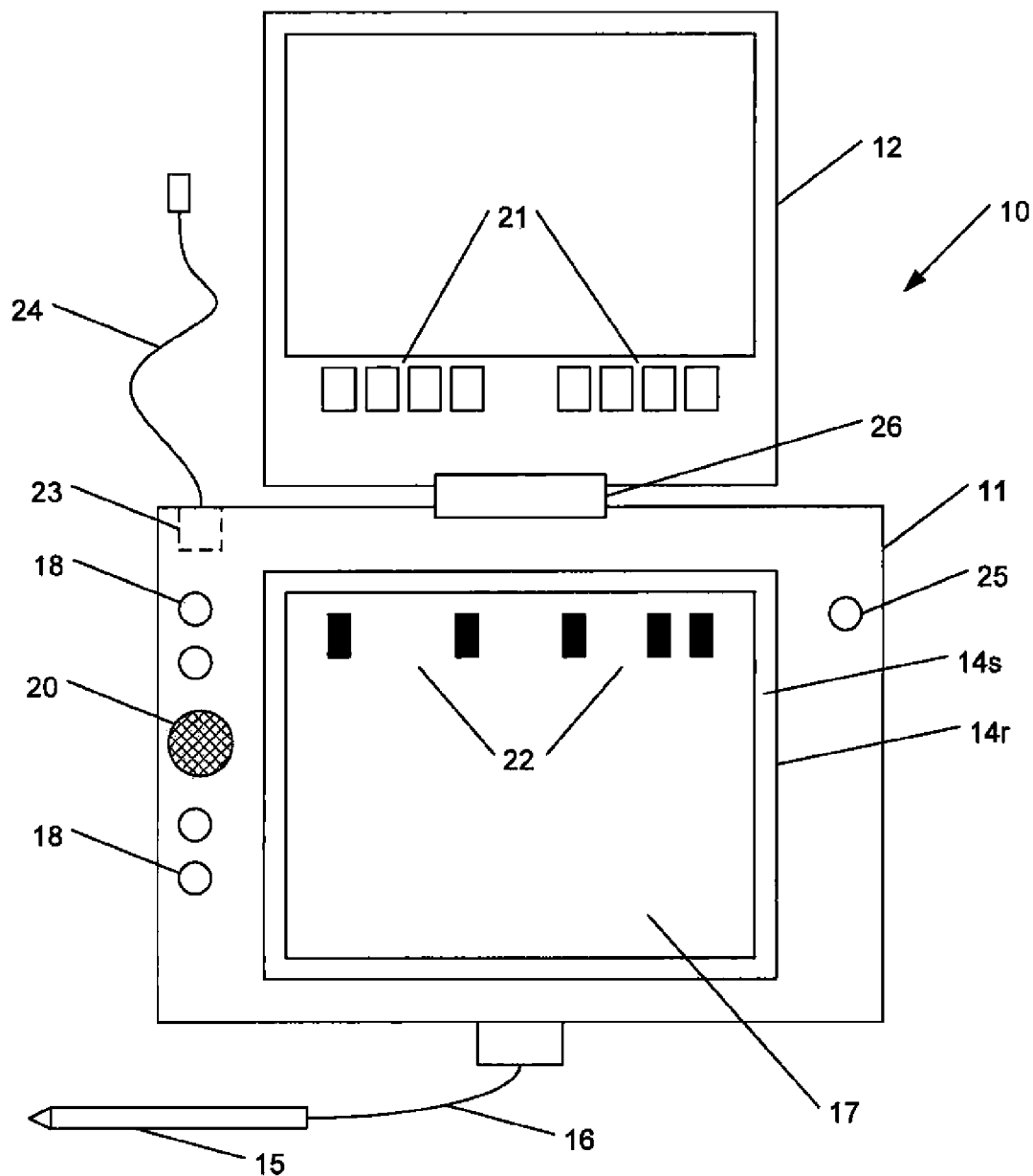
FIG. 1 is an illustration of the PC connectable electronic learning aid device of the present invention shown with an activity worksheet in its "in use" position and its cover in an "open" position.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 2:
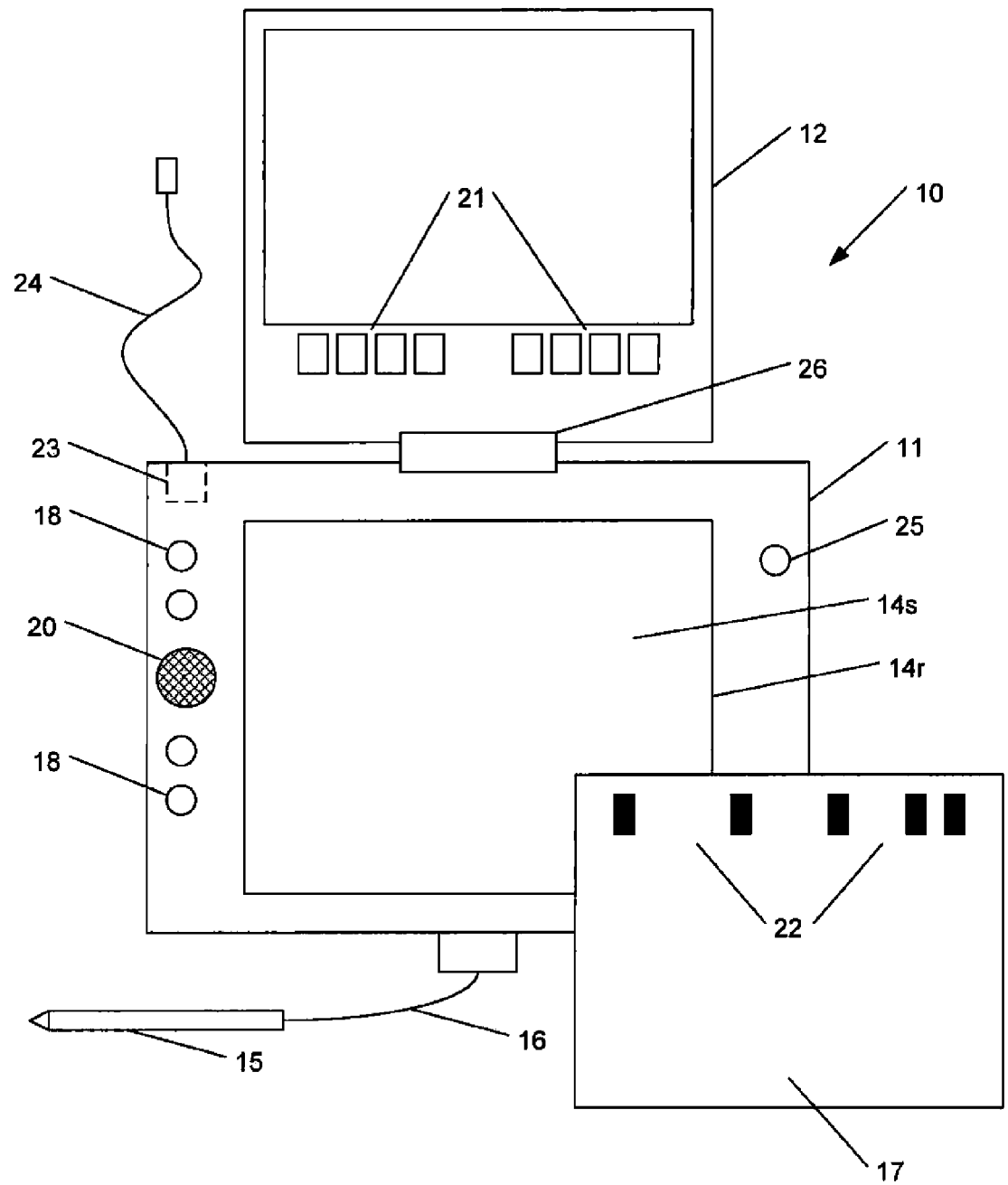
FIG. 2 is an illustration of the PC connectable electronic learning aid of the present invention shown with an activity worksheet partially removed from the learning aid device and its cover in an "open" position.
Figure 4:
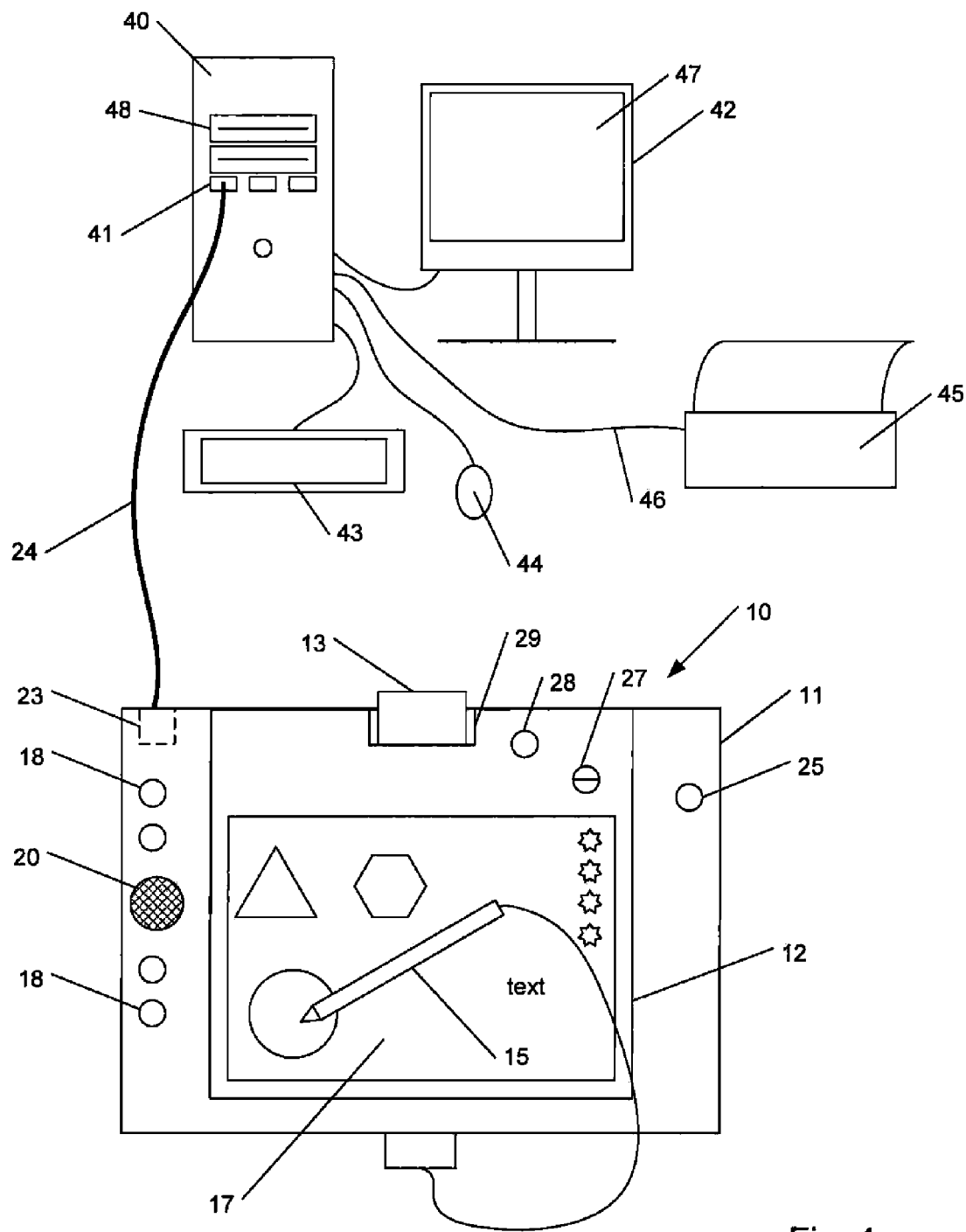
FIG. 4 is an illustration of the PC connectable electronic learning aid of the present invention shown with an activity worksheet in its "in use" position, the cover in a "closed" position and the learning aid connected to a PC.

With reference to FIGS. 1, 2, and 4, a portable learning device 10 in accordance with an embodiment is described below. Specifically, FIG. 1 illustrates the portable learning device 10 with an activity worksheet 17 in an "in use" position and its cover 12 in an "open" position; FIG. 2 illustrates the portable learning device with the activity worksheet 17 partially removed from the device 10 and its cover 12 in the "open" position; FIG. 4 illustrates the portable learning device 10 with the activity worksheet 17 in the "in use" position, its cover 12 in a "closed" position, and the device connected to a PC.

Learning device 10 is illustrated as comprising a base unit 11 having a hinged cover 12 joined to base unit 11 by hinge 26. In one embodiment, the hinged cover 12 may include a transparent center region. The learning device 10 may include a number of functional buttons used to operate the device 10, including but not limited to a power button 25, one or more volume buttons 27, and a downloaded activities button 28. It should be appreciated that the functional buttons may be placed in various locations on the device 10. For example, the buttons may be located in the base unit 11 or in the cover 12.

Base unit 11 is shown including a substantially rectangular recessed region 14R capable of accepting receipt of an activity worksheet 17 which, when positioned within recess 14R, is enclosed and protected by cover 12 when in its closed position. Beneath the surface of recess 14R lies sensor region 14S that operates in cooperation with stylus 15 to determine where on the activity worksheet 17 overlying sensor region 14S the stylus 15 has contacted the worksheet 17. Stylus 15 is illustrated as being electrically connected to the internal microprocessor base circuitry (not shown) within base unit 11 by wire 16. In one embodiment, the wire 16 is permanently fixed to the device 10. In another embodiment, the wire 16 is removable from the device 10. The stylus may also connect to the device 10 wireless such, for example, through an RF protocol.

A code-reading device 21 is illustrated as being positioned on the inwardly facing interior surface of transparent cover 12 which cooperates with and reads the page code 22 which is pre-printed on activity worksheet 17. The code-reading device 21 is positioned to align and overlie the page code 22 when cover 12 is in its closed position. In one embodiment, the code-reading device 21 may be a barcode scanner, and the page code 22 may be a barcode. In another embodiment, the code-reading device 21 may include a plurality of photo light sensors, and the page code 22 may include an optically readable code. It is appreciated that the numerous other forms of page code 22 and corresponding code-reading devices 21 may be used, in accordance with other embodiments of the present invention.

The device 10 may also include a light array 18 towards providing illuminated indications to the user of various functions and modes of device 10. Speaker 20 is provided on the upper facing surface of housing 11 towards presenting audible sounds and synthesized human speech supporting the interaction of the device with the child.

When cover 12 is in its closed position, it secures the position of the worksheet 17 and permits the child to view the text and images printed thereon and manipulate the stylus 15 to select or designate various tests or images printed thereon. In embodiments where the cover 12 includes a transparent center region, the transparent center region further serves to protect the activity worksheet 17 and yet still permit the child to view the text and images printed thereon and manipulate the stylus to select or designate various test or images printed thereon without damage or wear to the printed activity page. In an alternative embodiment, cover 12 may only cover the area of worksheet 17 incorporating page code 22. Alternative configurations and placement of the code reading device 21 are contemplated and deemed within the scope of the present invention. For example, the code-reading device 21 may be positioned in an opening within housing 11 into which at least the margin of worksheet 17 containing the page code 22 is inserted when positioned on recess 14R. The device 10 also includes a USB port 23 for accepting receipt of USB cable 24 which is used to connect device 10 to a personal computer towards permitting the device 10 to operate in a PC mode as opposed to a stand-alone mode.

Housing 11 and cover 12 contain the electronic circuitry controlling the operation of device 10, including for example the microprocessor, RAM, ROM, flash memory, touch sensor control circuitry, code-reading device circuitry, power supply etc., which are all known to those skilled in the relevant art and according are not specifically disclosed herein. In one embodiment of the present invention sensor region 14S comprises a "proximity detection circuit" that functions in connection with stylus 15 and serves to permit the child to manipulate the stylus 15 and touch it to a specific area or point on the upper facing surface of the activity worksheet 17 whereby the device is able to determine the point of contact, and thus the object "selected" by the child. Further, the device 10 may include a cartridge reader 29 operable to receive and read a cartridge 13, which may include computer-readable instructions corresponding to one or more particular games and/or activities.

In a preferred embodiment of the present invention, pre-printed activity pages present different activities and subject matters of various degrees of skill and complexity directed to children of varying age ranges. For example, an activity worksheet 17 directed to a pre-school age child may include a pictorial representation of a cartoon scene picturing various characters and objects whereby when the child touches a specific picture on the page using the stylus, an audible response in synthesized human speech will be generated to the child identifying the object touched. As will be appreciated, page code 22 is used to identify the individual activity worksheets and distinguish one from another whereby a particular activity worksheet is made known to device 10 such that the correct audible responses are generated when the stylus is manipulated and brought into contact with the touch sensor by the child.

One aspect of the present invention provides for operation of device 10 in a stand-alone mode whereby device 10 pictured in FIG. 1 may be used on a stand-alone basis towards providing educational and entertainment activities to a child, whereby the interaction between the device and the child takes place via the child's manipulation of stylus 15. The nature and level of the specific activity will dictate whether the device responds to the child's prompted or un-prompted selection of specific text or images appearing on worksheet 17. For example, the child may be prompted to provide a response to a prompt given via sound effect and/or synthesized human speech where the child's response is submitted using the stylus 15 and bringing the same into contact with the activity worksheet 17, albeit protected by the cover 12.

Figure 3:
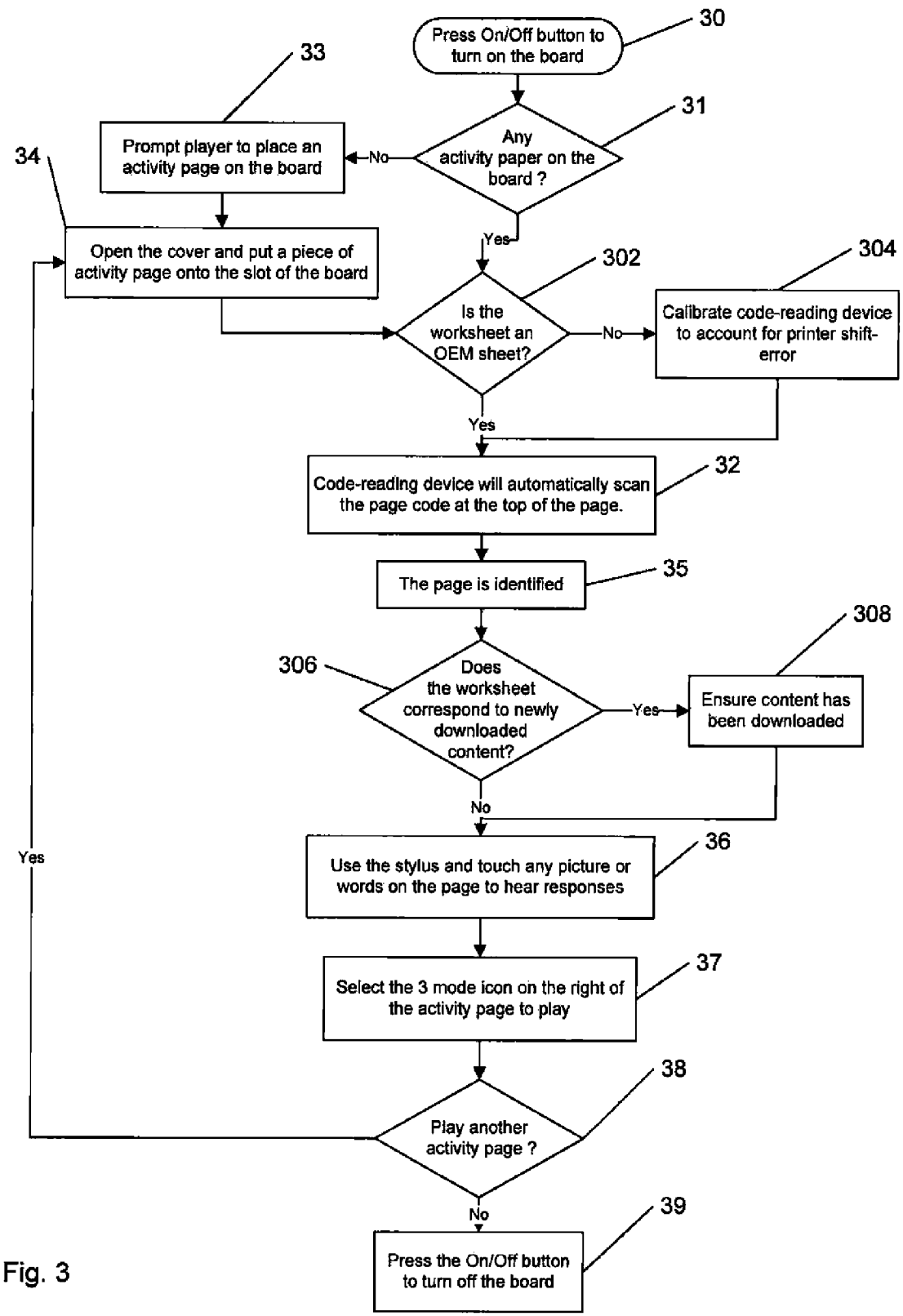
FIG. 3 is a flow chart illustrating the operation of one embodiment of the present invention operating in a stand-alone mode.

FIG. 3 of the drawings is a flow chart illustrating the various functions of the device 10 operating in stand-alone mode, in accordance with an embodiment of the present invention. Operation of the device 10 begins at step 30 with the child pressing the on/off button 25 to turn device 10 on. Software stored within a cartridge 13 or within read-only memory within device 10 controls the overall operation of the device and is not described in detail herein inasmuch as such software and the ability to create same is known to those of ordinary skill in the relevant art. Additional curriculum activity content, including voice and software, may be downloaded from the Internet via a PC and then further downloaded to the memory of the device 10. In embodiments in which the device 10 includes a cartridge reader 29, the process may also include the additional step (not illustrated) of determining whether a cartridge 13 is present in the reader 29. If so, then the device may automatically load the software from the cartridge 13. If, on the other hand, a cartridge is not present, then the device may load game/activity software from read-only memory or flash memory within the device 10.

At step 31 the device determines whether an activity worksheet is present on the top-facing surface of housing 11, specifically within recess 14S. The determination of the presence or absence of the activity sheet on the device may be accomplished by any number of means including the use of photo cells and/or other sensors which may be triggered when a sheet is placed on the device 10. If device 10 determines that no activity paper is present on the device, the user is prompted to place an activity page on the device (step 33). The child is thus prompted and expected to respond by opening cover 12 and placing an activity worksheet 17 onto the sensor surface 14s of device 10 and closing the cover 12 (step 34). The device 10 then determines whether the inserted worksheet 17 is a pre-printed worksheet. If yes, device will then determine the identity of the activity worksheet 17 via code-reading device 21 which automatically scans page code 22 printed on the top edge of activity worksheet 17 when cover 12 is closed (step 32). The particular activity worksheet is thus identified (step 35). If the worksheet is not an OEM worksheet (i.e., printed by the user) (step 302), the code-reading device is calibrated to account for printer shift-error (step 304) before proceeding to scan the page code.

At step 306, a determination is made as to whether the worksheet corresponds to newly downloaded content. If it does, the device ensures that the corresponding new content has been downloaded (step 308). This may involve, for example, checking for the content and downloading the content (e.g., via the Internet) if necessary.

The child is then able to use stylus 15 to, for example, select images, pictures or text printed on the worksheet 17 which may in turn trigger the generation of an audible response heard via speaker 20 and identifying the image, picture or text selected (step 36). More advanced and complex activities may also be offered by other worksheets 17 in alternate embodiments of the present invention, each requiring more complex interaction with the device 10. For example, an activity worksheet 17 may include the printed English alphabet with the child being prompted to spell a particular object printed on the sheet, such as a "bird," with, in turn, the expectation being that the child would use the stylus to touch the printed letters ""b", "i", "r", "d"," in order to correctly spell the word "bird." The child may additionally use stylus 15 to select various printed icons, for example printed along the right margin of an activity worksheet 17 in order to select different activities which may be played (step 37). In one embodiment of the present invention, each activity worksheet 17 incorporates between 2 to 5 activities with each activity including 6 to 10 sections or prompts. It should be appreciated, however, that any number of activities and corresponding sections/prompts is possible for each worksheet.

At step 38, the user may elect to change activity worksheets and accordingly would return to step 34, open the cover 12 and replace the activity worksheet with another, proceeding then eventually to step 32 which will again scan activity worksheet 17 reading the printed barcode 22 toward identifying the sheet 17 and the activities available thereon. Alternatively, at step 39, the child may elect to again press on/off button 25 to turn off device 10.

With reference again to FIG. 4, operation of device 10 in the PC mode of operation is illustrated. In the PC mode of operation pictured, device 10 is shown electrically connected to personal computer (PC) 40 via USB cable 24 which is, in turn, connected to USB port 41 on computer 40. PC 40 includes the typical components, namely video monitor 42, keyboard 43, and input mouse 44. Printer 45 is further illustrated as being electrically connected to PC 40 via connection cable 46, typically another USB cable. PC 40 further includes CD-ROM drive 48 capable of accepting receipt of and reading a CD-ROM. The PC mode of operation of embodiments of the present invention has the ability for the student to engage in the very same activities that are available when using device 10 in a stand-alone mode, but instead using a personal computer. The child may use keyboard 43 and/or mouse 44 to move a cursor on display screen 42 to highlight and select one or more of the items pictured thereon. Alternatively, the child may use stylus 15 of the portable device 10 as the input mechanism wherein movement of the stylus on the worksheet 17 will translate to movement of the cursor on video monitor 42 inasmuch as video display 42 presents to the user/child an image that is substantially the same as that printed on a pre-printed activity worksheet 17. One further characteristic of various embodiments is the ability of display 42 to present both a still image corresponding to the activity worksheet 17 positioned on housing 12 as well as animated graphics which may be used to reinforce correct answers provided by the child, provide encouragement to the child or otherwise promote continued use of the device.

FIGS. 5a-d of the present invention illustrate one exemplar operation of the present invention in PC mode using one specific activity worksheet with the understanding that different activities may indeed be provided for and made available for the child. Operation of the device in the PC mode begins at step 51 with switching on the PC. After the software associated with the learning device 10 has been installed onto the PC 40 (from a CD-ROM disc provided with device 10, for example), the device can be turned on/activated either by clicking an application icon on the PC desktop (step 52) or by pressing the on/off button on the device itself (step 53). The user may then be required to login (step 54)

In one embodiment, the user has the option of controlling play via the device 10 or via the PC 40 (step 55). For example, the child may use mouse 44 to move a cursor on display 42, or may use keyboard 43 to select a specific activity on activity worksheet 17 depicted on monitor 42 as image 47 (step 56). Alternatively, the child can use the stylus 15 to manipulate the cursor on the screen 42 to select a specific activity pictured on display 47 (step 57). The user thus has the option of using the personal computer input device, namely a keyboard and mouse or alternatively a stylus on the device towards controlling the program running on PC 40. An opening animation may then be played for the user (step 58), and the user is then presented with a Main Menu (step 59).

Figure 5A:
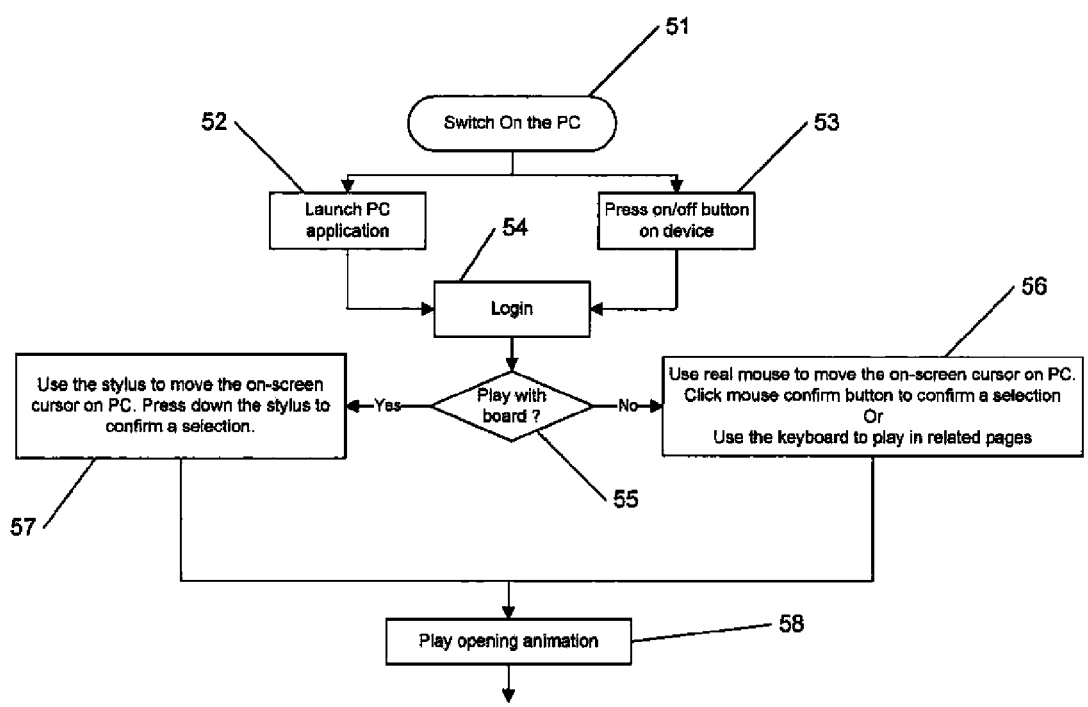
FIGS. 5a-5d comprise a flow chart illustrating the operation of one embodiment of the present invention operating in a PC mode.
Figure 5B:
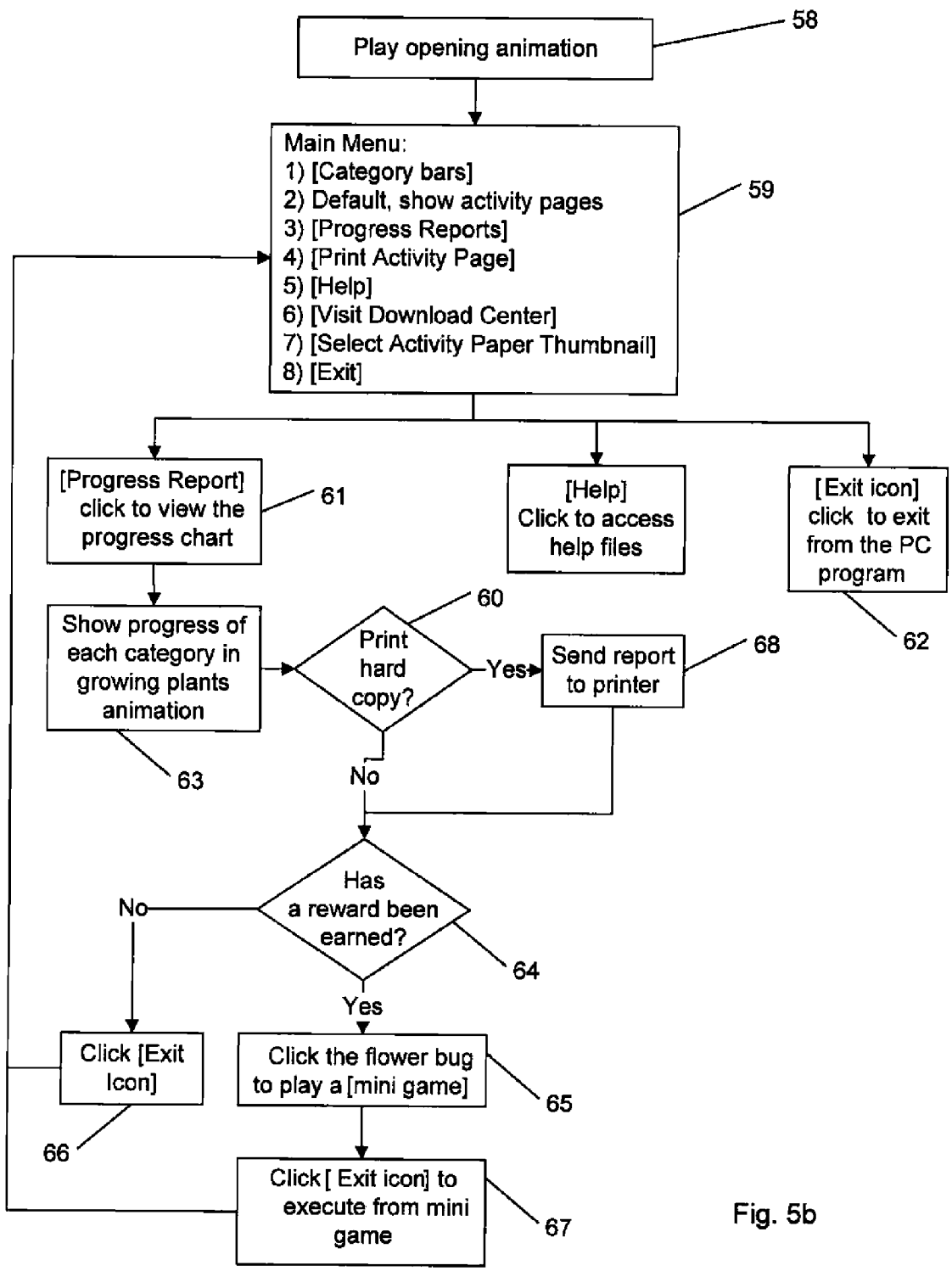
Figure 5C:
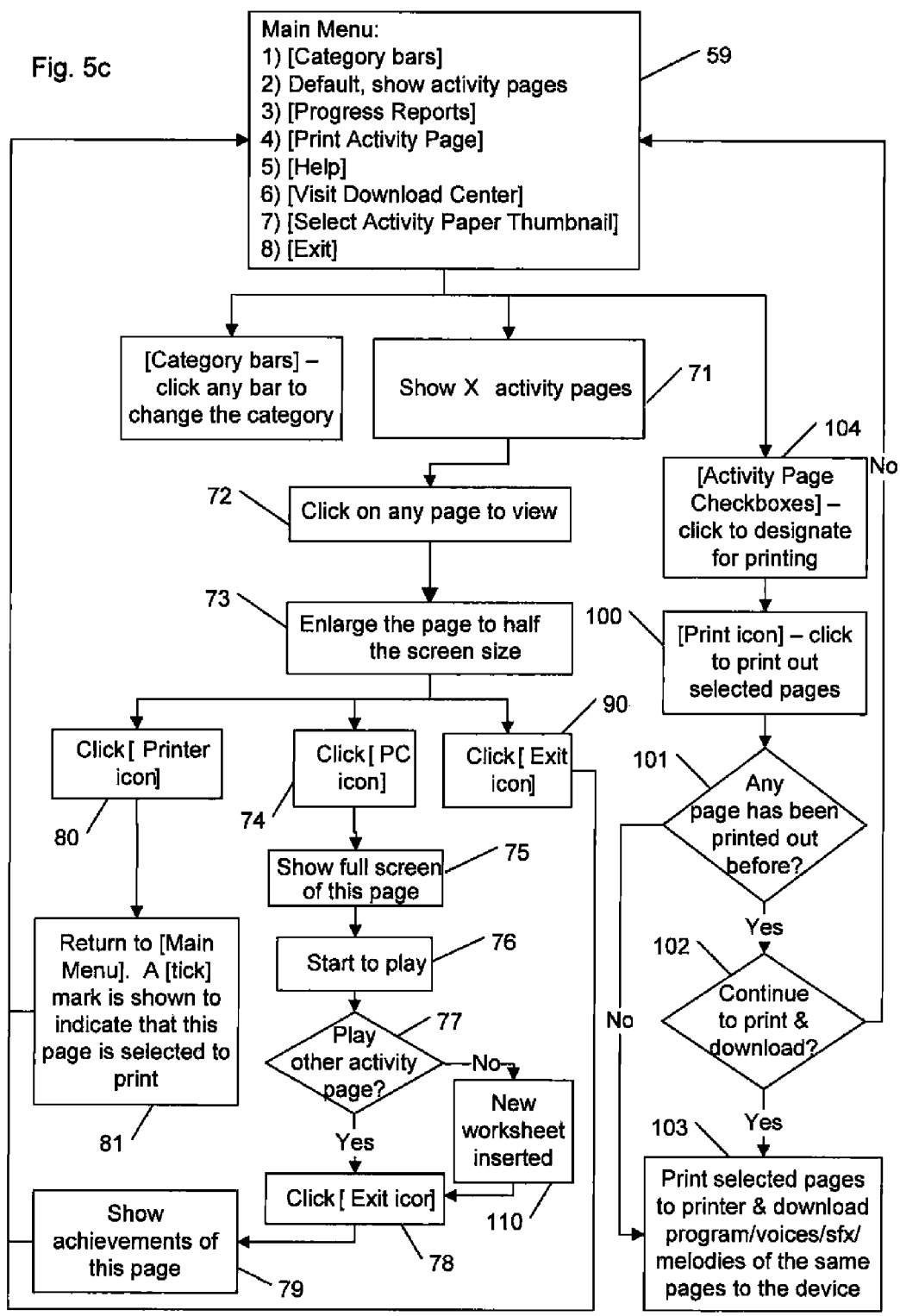
Figure 5D:
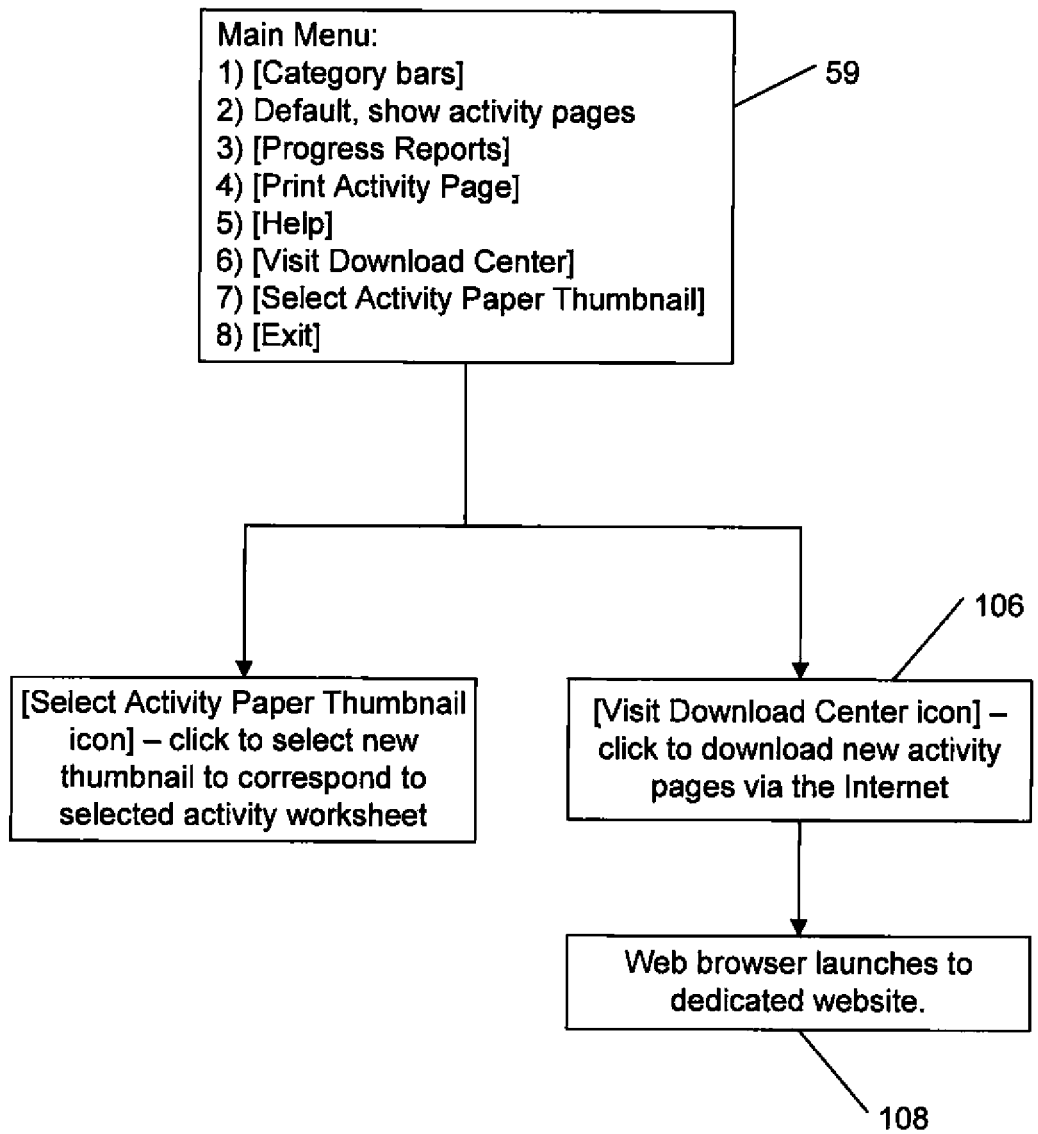

In one embodiment of the present invention the Main Menu includes 8 specific functions or icons, namely "1 Categories", "2 default" showing a number of thumbnails of a selected category, "3 Progress Report", "4 Print Activity Page", "5 Help", "6 Visit Download Center", "7 Select Activity Paper Thumbnail", and "8 Exit" (FIG. 5b).

One feature of the present embodiment is the ability for the child or parent to cause the software to print new or replacement activity pages (FIG. 5c) which may be positioned on device 10 in recessed area 14S. To select an activity page for printing, the user may click a checkbox of a corresponding activity page thumbnail (step 104). Selecting option 4, Print Activity Page icon at step 100 causes the software to execute a print dialog for printing the selected activity worksheet(s). In one embodiment, the print dialog may prompt the user to respond to the question whether anyone has printed the particular activity page before, step 101. If the response is yes, the user is then prompted to respond to the question whether they wish to continue to print and download activities to the device 10, at step 102. If the user responds no, the user is returned to the main menu (step 59). If the user responds yes, then the apparatus proceeds to print the selected pages to printer 45 and to download the associated programming, sound effects, audio voices, music, etc. associated with those particular pages to device 10 (step 103). In this manner, the provided software is used to update the content of device 10 without the need to establish a connection via the internet or any other direct communication link to an external server or other source of content in order to gain access to new activity pages and associated content. The software initially provided with the unit provides additional activity pages above and beyond those provided in pre-printed form.

The user may acquire additional software containing additional activity pages capable of being printed, together with associated audio, video, voice and control data and content capable of being downloaded to device 10, toward permitting the device to be used in both a stand-alone and PC connected mode as described below. If the PC is Internet-enabled, by clicking the Download Center icon (FIG. 5*d*, step 106), a web browser is launched and the user is directed to a dedicated website (step 108). From there, the user may download new software for playing a new game page in PC mode or further download to the device for playing in standalone mode.

To start playing, the user may put a worksheet 17 on the device 10, and the corresponding game will be launched. Alternatively, the user may select option 2 at step 59, causing the system to advance to step 71 (FIG. 5*c*) which displays a number of different activity pages or worksheets. The user may select, highlight and click on any depicted page (step 72) in order to view that page. The selected page may be viewed in an enlarged size, such as taking up half of the display screen (step 73). Clicking the PC icon (step 74) will cause the selected activity page to appear in full screen size (step 75). If the user elects to start play and use the pictured activity page (step 76), the user may use the stylus 15 or mouse 44 to explore and select any picture or text on the screen, which may in turn trigger the generation of an audible response. Rather than playing the pictured activity page, the user may elect to play another activity on that page, step 77. Alternatively, the user may play another activity page by simply replacing a new game worksheet 17 in recessed area 14S (step 110). When complete, the user may exit at step 78. Upon exiting a given activity page at step 79 the user may be presented with an indication of their achievement of the activity engaged in on that page. For example, the user may be presented with various forms of graphs, such as bar or line graphs or mere text descriptions describing, for example, the types and number of activities engaged in, the number of questions attempted and the number gotten right and the number gotten wrong. At which point the system returns to the main menu (step 59). Alternatively, the user may select option 1 and select one of multiple depicted categories depicted in bars in order to change a particular category, step 70 (FIG. 5*b*), at which point the activity is advanced to step 71 and proceeds as described above.

The user may also select option 3 from the main menu and advance to step 61 (FIG. 5*b*). At step 61 the user is given the option of viewing a progress report. If selected, the program advances to step 63 wherein the progress in each category is provided to the user. In one embodiment, progress may be shown in a manner that is appealing and encouraging to a child giving an immediate and recognizable indication of the progress, such as for example, by depicting in visual animation various plants growing in size in order to depict advancing progress (step 63). At steps 60 and 68, the user is allowed to print a hard-copy of the progress report. If a threshold level of progress is reached, the user may be given a reward (step 64). In one embodiment, the reward my include the option to play additional mini games that may comprise additional educational activities or alternatively entertainment activities (step 65). For example, to execute and play additional games or activities, the user may select and click on a flower, bug or other displayed icon triggering an animation, such as a rowing plant, to illustrate the child's progress. When complete, the user may exit from such mini game at step 67; alternatively, if sufficient threshold progress has not been made the program advances to step 66 wherein the process is concluded and the user will return the main menu (step 59).

One particularly novel aspect of the present invention is the ability for a teacher, parent or guardian to customize the curriculum presented by the printed activity worksheets and associated computer software providing visual and/or audio responses interaction. One specific feature of the curriculum customization aspect of the present invention is the performance review capability, which is applicable to worksheet-based activities which provide prompts for user responses where such responses may be evaluated as being right or wrong. Computer software within the portable device 10 serves to monitor the child's progress and record data identifying, at a minimum, the particular worksheets and the percentage of questions or prompts which are answered correctly by the student. In one embodiment of the present invention, the progress data being logged by the device may include additional data points, such as the date or dates upon which a particular activity was "played" by the child and, indeed, the number of times a particular activity may have been played, if played on multiple occasions. Still further, the data performance log may additionally include the number of times a child responded to a particular question before giving the correct answer where the activity permitted the child multiple opportunities to respond.

According to one embodiment of the present invention, the child's "score" and/or progress data will be automatically uploaded from portable device 10 to PC 40 each time the device 10 is reconnected to the PC. In this manner, the software within the PC is able to receive, record and tally the child's performance on an on-going basis. The parent may, of course, choose to connect and upload the performance data after a child has completed each activity, which may comprise multiple worksheets or, indeed, on a daily basis, regardless of how many questions and/or activity worksheets the child was able to complete. The parent is thus able to utilize the PC and view the child's performance. In an alternative embodiment of the present invention, after executing a predetermined number of activities or after a predetermined passage of time the device may generate a prompt signaling the user to connect the device 10 to the PC toward uploading performance data.

Figure 6:
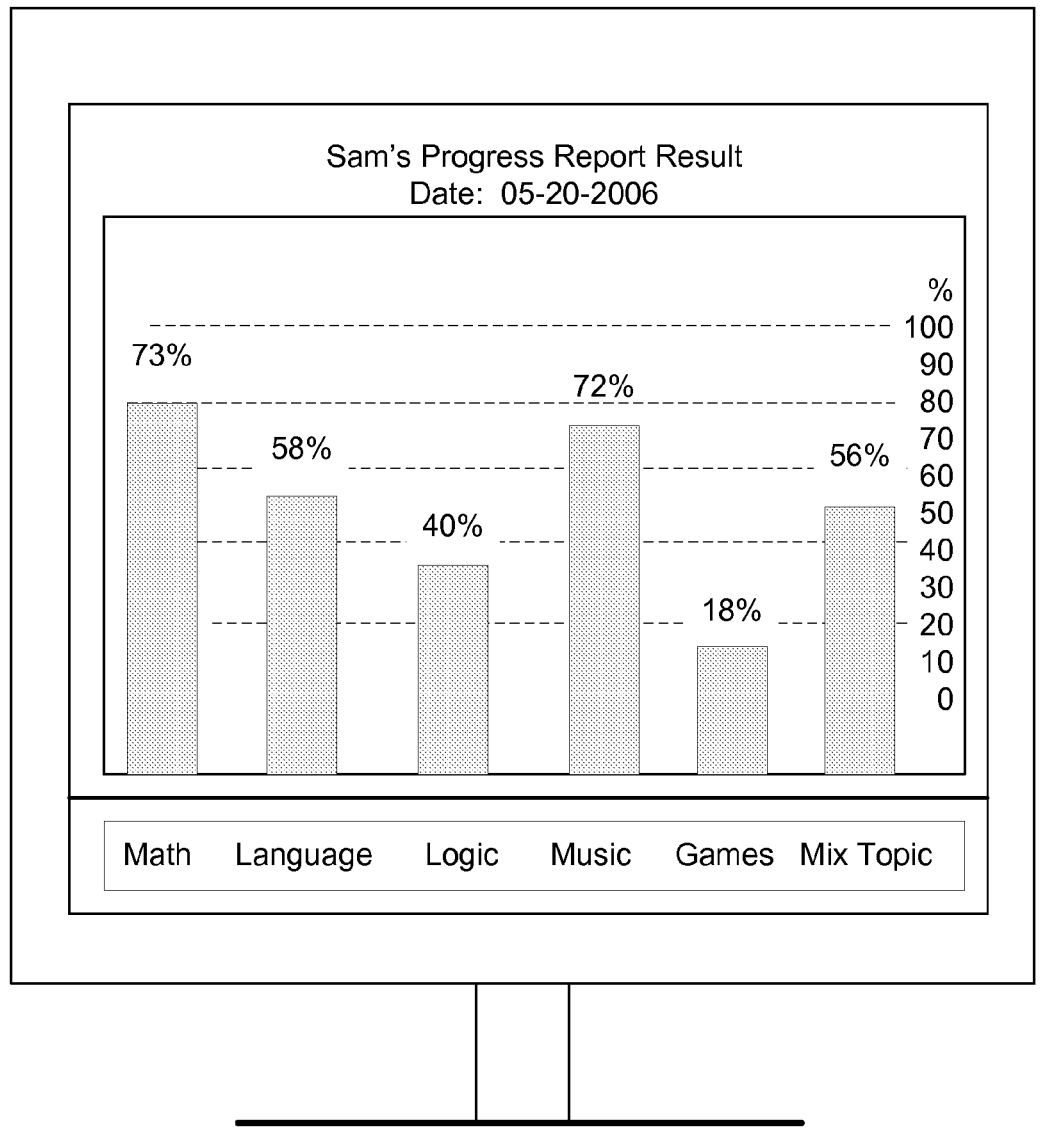
FIG. 6 illustrates the video display comprising one embodiment of a progress report intended for a parent.
Figure 7:
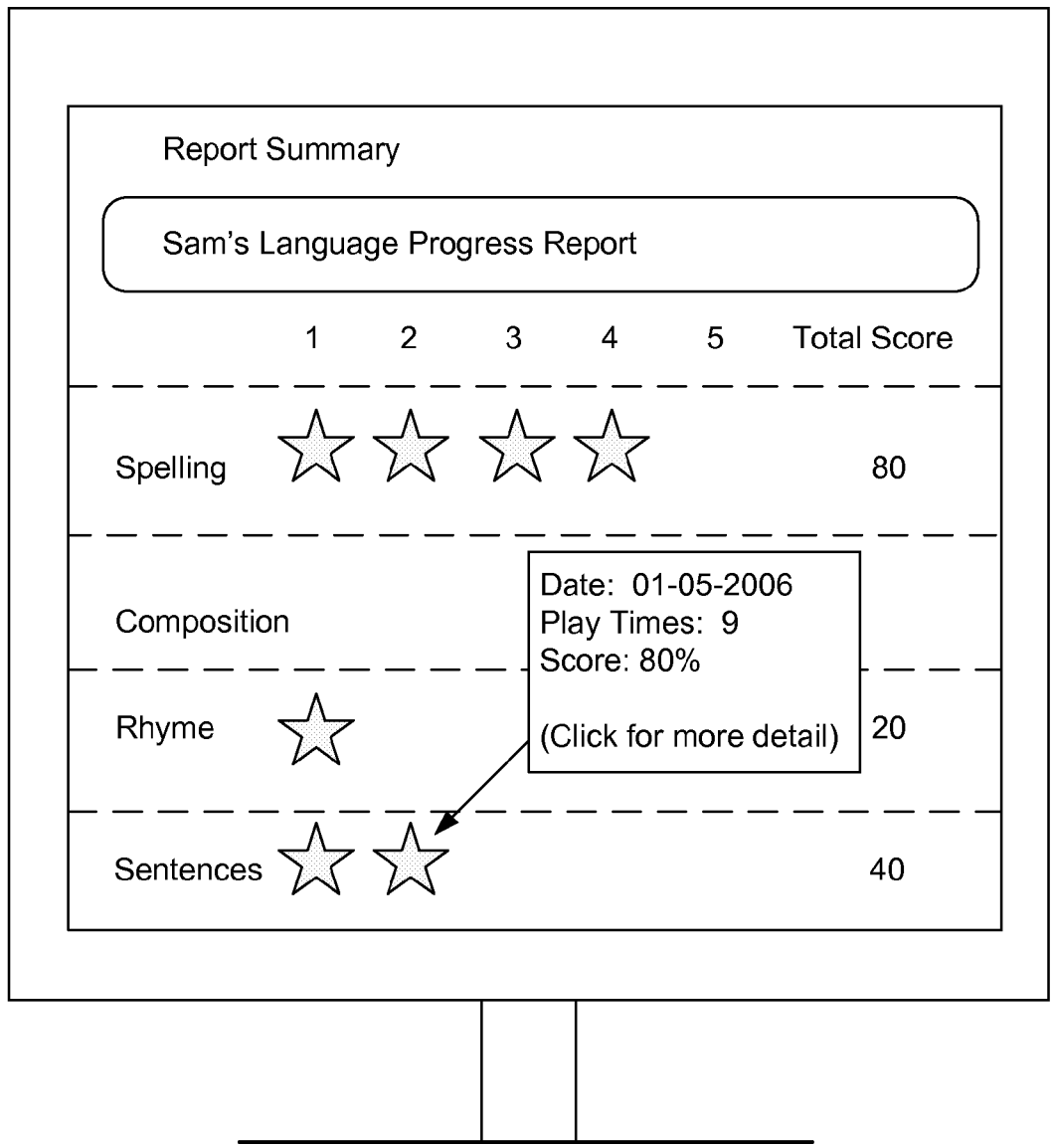
FIG. 7 illustrates the video display comprising one embodiment of a progress report intended for a child.

The child's performance may be presented in multiple formats wherein one format may be intended to be viewed and interpreted by a parent, and a second format intended to be viewed and interpreted by the child. It is contemplated that the progress report format directed to a parent will provide more substantive detailed information, for example, identifying a specific percentage of questions by subject matter, which are answered correctly by the child, including by providing said data in either chart or bar graph format. For example, as illustrated in FIG. 6, a bar graph may be used to convey to the parent the percent of correct answers provided by the child by subject matter, such as math, language, logic, music, games, as well as a mixed topic category. An absolute percentage may appear in text. The parent may thus readily see the relative performance by subject matter and easily identify areas requiring improvement. A format for presenting the progress report to a child preferably takes on a more child-friendly format. According to one embodiment of the present invention, illustrated in FIG. 7, the child's performance is presented by category with one or more icons, such as stars, displayed to indicate the relative performance where more stars correspond to a greater total score achieved on a particular subject matter. According to the present invention, the child can obtain additional information relative to his or her performance by moving a cursor over a displayed star, (such as by using the stylus 15 to position a cursor on display 42) which in turn generates a dialog box indicating the date of play, the number of play times and a total score. Clicking on the star will display more detailed progress and performance information. In this fashion, a graphic display is presented in a non-threatening manner encouraging the child and readily conveying to a child the extent of his or her successful performance on an activity-by-activity basis.

A detailed progress report may also be presented in a manner that summarizes and conveys the child's performance that has transpired since the last time the performance data has been uploaded from the portable device to the PC, FIG. 8. Specifically, the progress report conveys the title of the particular activity, the skill level selected and an absolute score, together with the level and corresponding exercise performed by the child. According to one embodiment of the present invention, the progress report further identifies subjects and exercises that are identified to the parent as "areas of strength" where a child is deemed to be performing above a threshold level. The progress report further identifies subjects and activities that are deemed to require extra practice, where, for example, a child's performance is falls below a specific threshold level. Still further, the progress report will provide to the parent recommendations for additional activities and curriculum customization, for example, by suggesting more advanced subjects or more difficult levels within a particular subject where the child consistently performs above a specified threshold.

Using the information presented to the parent or teacher as the progress report information, the parent or teacher is able to customize the curriculum according to the following process. Using the PC, its keyboard and monitor, the parent is able to access menus and review different subjects towards configuring further activities for execution by the child. For example, the parent may view one or more activities, such as language, math, music, geography, science, etc., and select from within one or more subjects additional activity sheets for printing and subsequent use by the child.

When selecting the language subject for example, the parent is presented with a number of different pre-defined activity worksheets, all relating to the language subject, such as, for example, spelling, composition, rhyme, sentence structure, etc., where multiple themes may be used for a given activity to further customize a curriculum for a particular child. For example, one or more activity worksheets for spelling may be offered, each having themes that are deemed more desirable by girls, together with one or more activity worksheets, also for spelling, having themes deemed more desirable for boys, such as sports. In this manner, a parent can provide a further level of customization and configure a curriculum that not only addresses the substantive educational subject areas, but also incorporate themes or areas of interest which a parent knows to be of interest to the child, towards fostering use of the device and promoting learning.

Figure 9:
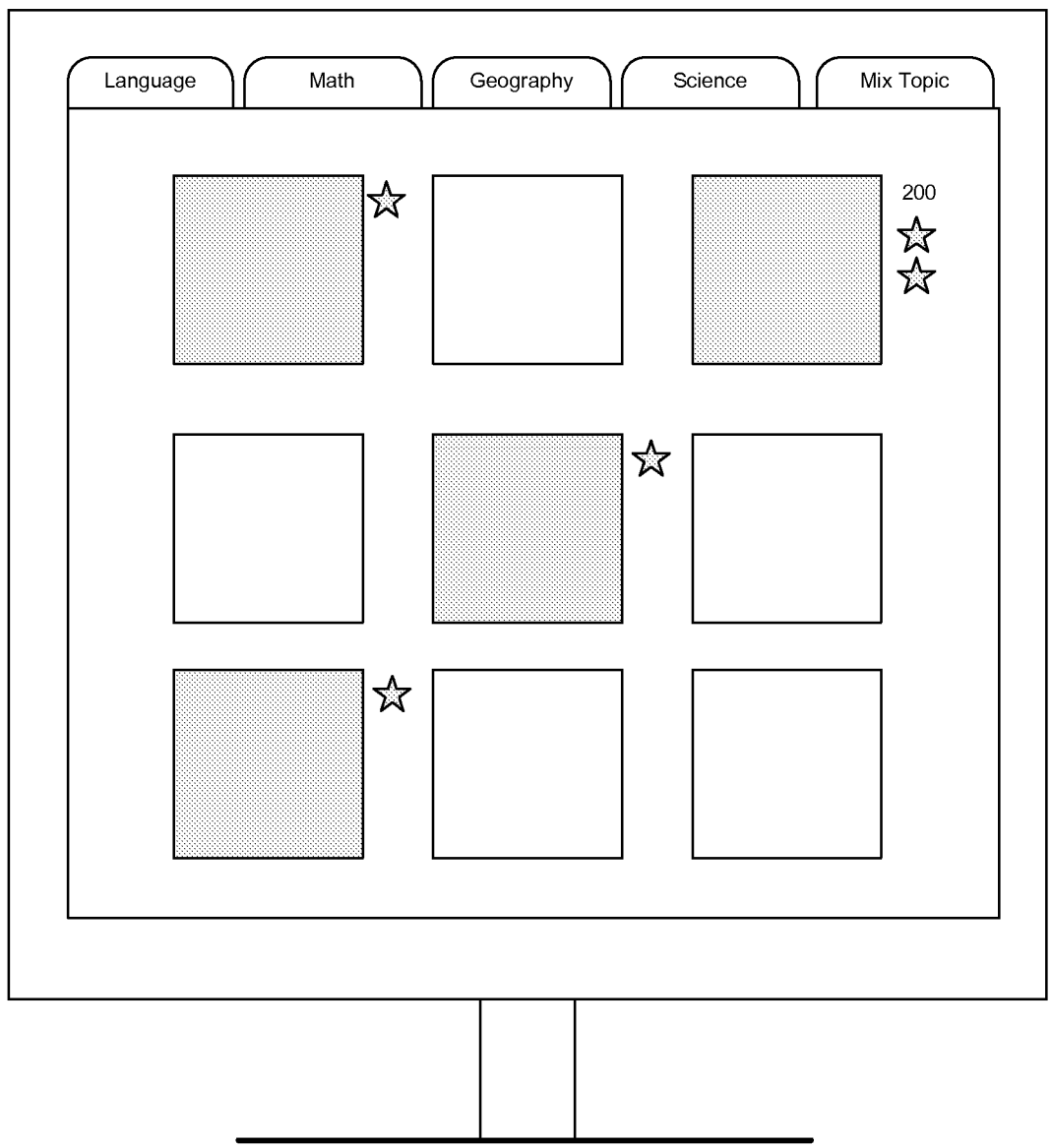
FIG. 9 illustrates the video display comprising an alternative embodiment of a progress report intended for a parent.

One aspect of the user interface presented to the parent is illustrated in FIG. 9. In the embodiment illustrated, the parent is easily able to view the different subject matters by selecting from the tabs appearing across the upper margin of the display thus viewing, in the embodiment illustrated, nine different activity worksheets for each particular subject. It is a further feature of the present invention to provide an indication to the parent of which activity worksheets the child has previously executed and, moreover, the performance or scores achieved. In the embodiment illustrated, activity worksheets that a child has previously performed are shown grayed out or otherwise having a different background color. Those activity worksheets not previously used are shown having a different visual appearance. In this manner, the parent is easily able to identify activity sheets which the child has previously executed from those which they have not, together with those upon which the child has performed better versus those on which they have not. The parent thus need only select a particular worksheet and send it to the printer, generating a hard copy print-out. At the same time, the game/education programming, together with the content data for that worksheet, are downloaded from the PC into the memory of the portable device 10. As with the pre-printed activity worksheets, a bar code is printed on each worksheet 17 which is able to be scanned by the portable device in the manner described above so as to identify the particular worksheet in place on base unit 12 and to access the appropriate corresponding programming and audio/video content having been previously downloaded.

One additional feature of the present invention is the ability to provide additional software, such as provided on CD-ROMs or through Internet download, which may offer additional subjects and/or additional levels of difficulty towards permitting the parent to select fixture and more customized activity worksheets, towards further stimulating and educating a particular child. Indeed, there is virtually no limit to the themes which may be appearing on a given activity worksheet, towards stimulating and keeping a child's interest where such themes may be incorporate popular, well-known and/or classical books, movies, characters, etc.

Yet another additional feature of the present invention presented in connection with a child's progress report is the ability for a child to access additional games or activities, which become available for play by the child when the child achieves a specific level of performance. For example, if a child surpasses a pre-defined threshold level of performance on a given activity, an icon, such as a unique star, may be presented on the visual display towards permitting the child to select such icon or star and access these additional entertainment-based games. In this manner, the child is further motivated to use the device and achieve a higher level of learning. In one embodiment of the present invention, the software includes both the application software for controlling the personal computer and presenting the various interfaces and otherwise operating the personal computer in connection with the functionality described herein. The software further contains the data necessary to generate a plurality of activity sheets, such as 40 or 50 such sheets, which may be printed by the parent, as well as the audio/visual sound effects and other content associated with each activity sheet, which, in turn, may be downloaded to the portable device when the given activity sheet is printed as described above. It will again be appreciated that the invention as described herein promotes use of the apparatus in a stand-alone manner, which prompts the child to use the device and achieve a level of learning, as well as permitting the device to be used in connection with a personal computer and, indeed, as a user input device, towards transitioning a child from the educational learning aid platform to a full-function personal computer and the activities available therein.

Thus, various embodiments provide a portable electronic educational learning aid device that may be used in a stand-alone mode and may also be connected to a personal computer and used in a PC mode. This permits the child to engage in the same education activities when the educational learning aid device is used in the PC mode as when used in a stand-alone mode. This further allows for the ability to utilize the video display monitor of the personal computer to function as a display screen for the electronic learning aid device and wherein the portable learning aid device may be used as an input device toward engaging in the educational activities running on the PC and specifically where the stylus and buttons located on the portable device may be used by the child to interact with the programming to, for example, navigate the learning activity and respond to questions posed thereby when the electronic education learning device is connected to the PC. The inter-operability between the device according to various embodiments and a PC assists the child in transitioning from an electronic educational learning aid device to a full fledged personal computer and encouraging the child to continue to use the electronic educational learning aid device given the enhanced ability to interact with the PC towards prolonging use of the product by a child without the need to learn the complexities of interacting with a typical personal computer.

Furthermore, various embodiments provide for monitoring the child's progress in a given subject matter by uploading to the PC the number of correct and incorrect responses provided by the child, by subject matter, and providing a progress report to a parent or teacher, toward permitting the parent or teacher to customize the curriculum and select additional activities to be downloaded from the Internet to the PC and device and made available to the child using the device in both PC and stand-alone modes. Accordingly, both parent/teacher and child may be provided with progress reports summarizing the child's performance and permitting the parent or teacher to configure new curriculum to alter the educational activities on the portable device to add new activities as the child progresses or repeat prior activities to reinforce subjects or address underperformance in particular subjects, including the ability to select and print new activity worksheets for use with the portable educational device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic learning aid apparatus having a stand alone mode and a PC mode, comprising:
    a base unit including a worksheet surface configured to accept a printed activity worksheet, a sensor element positioned beneath the worksheet surface, a microprocessor, a cover configured to overlay the at least one activity worksheet when in a closed position, a code-reading device, a memory configured to store digital speech data and digital control data, a speech synthesizer and speaker configured to convert the digital speech data into audible human speech, an input device in electrical communication with the microprocessor and configured to permit a user to provide input to the apparatus, and a communication port configured to permit the electronic learning aid apparatus to communicate with a personal computer; and
    at least one printed activity worksheet including a code configured to identify the particular activity worksheet and associated digital speech data and digital control data;
    wherein the code reading device is configured to read the code from the at least one printed activity worksheet in response to the cover being placed in the closed position;
    wherein, when in stand-alone mode, the microprocessor is configured to execute, based upon the digital speech data and digital control data, an activity associated with the at least one worksheet identified by the read code; and
    wherein, when in PC mode, the microprocessor is configured to cause, via the communication port, the personal computer to execute the activity associated with the at least one activity worksheet identified by the read code.

2. The apparatus of claim 1, wherein:
    the code comprises a barcode; and
    the code reading device comprises a barcode reader configured to read the barcode.

3. The apparatus of claim 1, wherein;
    the code comprises an optically detectable code; and
    the code reading device comprises a light sensor configured to read the optically detectable code.

4. The apparatus of claim 1, wherein the input device comprises a stylus configured to permit a user to interact with the activity executed by the electronic learning apparatus when in the stand-alone mode and to permit a user to interact with the activity executed by the personal computer when in the PC mode.

5. The apparatus of claim 1, wherein the cover includes the code reading device and is configured to move the code reading device proximate to the code of the overlaid at least one activity worksheet when in the closed position and to move the code reading device away from the code when in an opened position.

6. The apparatus of claim 1, wherein the cover further includes a transparent center region configured to permit, during execution of the activity, a user to view and interact with the at least one activity worksheet while protecting the at least one activity worksheet when the cover is in the closed position.

7. The apparatus of claim 1, wherein:
    the memory further includes digital data representing a plurality of requests for respective user responses and correct user responses corresponding to said plurality of requests; and
    the microprocessor, based on the digital data, is configured to cause the speech synthesizer and speaker to output synthesized human speech for a request of the plurality of requests and to determine whether a user response to the request is correct.

8. The apparatus of claim 7, wherein the microprocessor is further configured to cause the speech synthesizer and speaker to output an indication in synthesized human speech of whether the user response to the request is correct.

9. The apparatus of claim 7, wherein the microprocessor is further configured to provide a visual indication of whether the user response to the request is correct.

10. The apparatus of claim 7, wherein the plurality of requests includes at least one request for a user to manipulate the input device to identify an object appearing on the printed activity worksheet.

11. A method of utilizing a portable electronic learning aid apparatus having a stand-alone mode and a PC mode, the method comprising:
    placing on the portable learning aid apparatus, a printed activity worksheet having a pre-printed page code;
    reading the pre-printed page code with the portable learning aid apparatus in response to positioning a cover over the printed activity worksheet by closing the cover of the portable learning aid apparatus;
    executing an activity of the printed activity worksheet on the portable learning aid apparatus using the stand-alone mode of the portable learning aid apparatus;
    establishing a connection between the portable electronic learning aid apparatus and a personal computer including at least a base unit, video monitor and input device;
    presenting on the video monitor an image corresponding to the printed activity worksheet present on the portable learning aid apparatus in response to receiving an indication of the pre-printed page code from the portable learning aid apparatus; and executing the activity of the printed activity worksheet on the personal computer using the PC mode of the portable learning aid apparatus.

12. The method of claim 11, further comprising presenting on the video monitor an animated graphic associated with the printed activity worksheet present on the portable learning aid apparatus.

13. The method of claim 11, further comprising accepting at the personal computer input from the user provided using the input device associated with the personal computer.

14. The method of claim 11, further comprising:
presenting one or more requests in synthesized human speech for respective user responses; and
providing the user with an audible response indicative of the appropriateness of the user's response with respect to the appropriate user response corresponding to the request presented in synthesized human speech.

15. The method of claim 11, further comprising transferring performance data from the portable electronic learning aid apparatus to the personal computer indicative of the user's performance in interacting with activities presented by the activity worksheet.

16. The method of claim 11, further comprising:
providing input to the personal computer using a stylus associated with the portable learning aid apparatus; and
presenting a response to the input on the video monitor in response.

17. The method of claim 11, further comprising:
transferring performance data from the portable electronic learning aid apparatus to the personal computer indicative of the user's performance in engaging in activities presented by the printed activity worksheet;
presenting a performance report via a video display of the personal computer;
presenting, via the video display of the personal computer, a library of activity worksheets to enable selection of additional activity worksheets based upon the user's past performance;
printing an activity worksheet via a printer communicatively coupled to the personal computer in response to selecting the activity worksheet from the library of activity worksheets presented via the video display;
transferring digital speech data and digital control data associated with the selected activity worksheets from the personal computer to the portable electronic learning aid apparatus; and
disconnecting the portable electronic learning aid apparatus from the personal computer to permit the user to interact with the selected activity worksheets using the portable electronic learning aid apparatus in the stand-alone mode.

18. The method of claim 17, wherein said transferring performance data from the portable electronic learning aid apparatus to the personal computer takes place automatically upon the portable electronic learning aid apparatus being connected to the personal computer.

19. The method of claim 17, wherein said transferring digital speech data and digital control data from the personal computer to the portable electronic learning aid apparatus takes place automatically upon printing the selected activity worksheet.

* * * * *

UNITED STATES PATENT AND TRADEMARK OFFICE
CERTIFICATE OF CORRECTION

| | | |
|---|---|---|
| PATENT NO. | : 8,655,258 B2 | Page 1 of 1 |
| APPLICATION NO. | : 11/873669 | |
| DATED | : February 18, 2014 | |
| INVENTOR(S) | : Fung | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1533 days.

Signed and Sealed this
Eleventh Day of August, 2015

Michelle K. Lee
*Director of the United States Patent and Trademark Office*